UNITED STATES PATENT OFFICE.

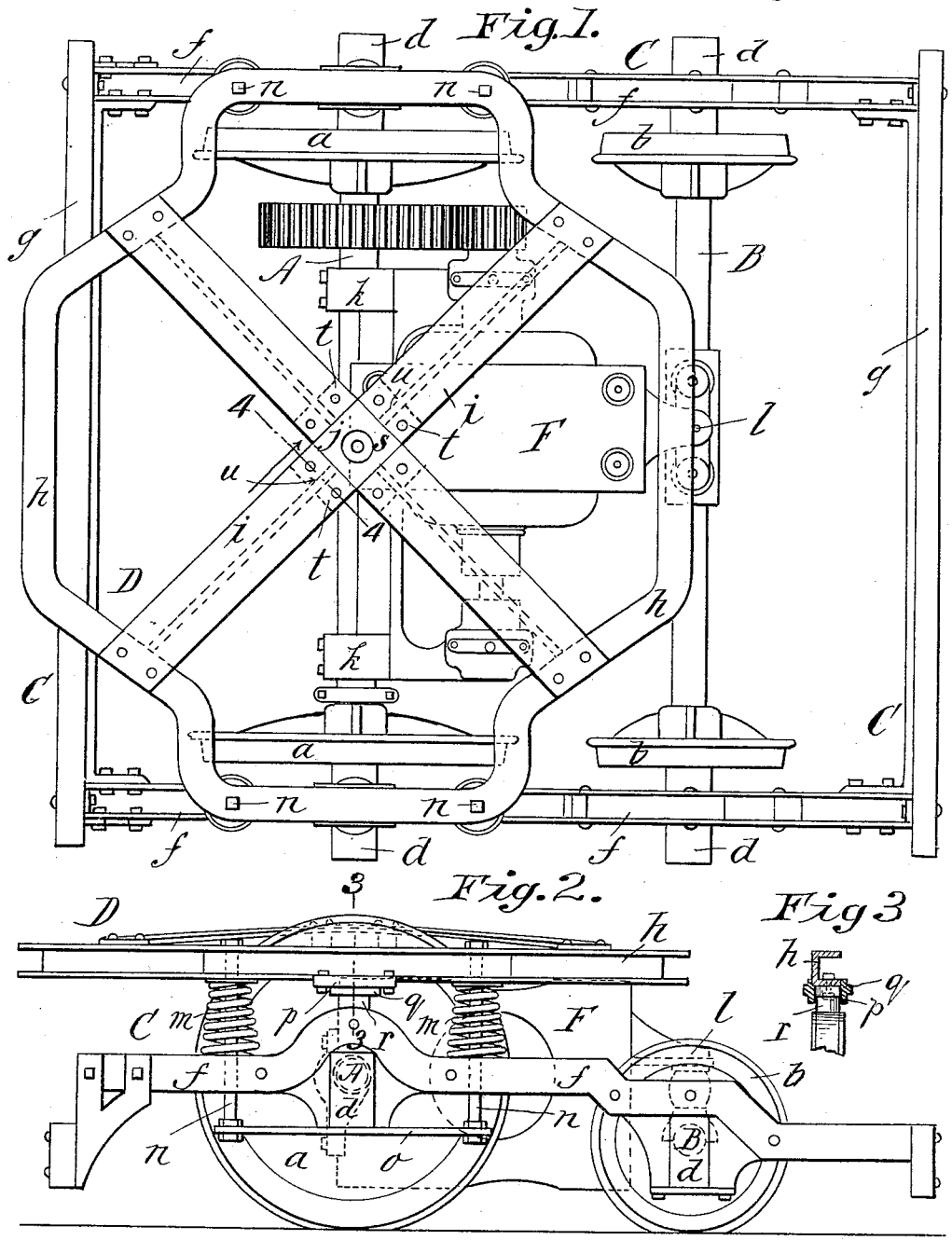

ERNEST D. DORCHESTER, OF MALDEN, MASSACHUSETTS.

TRUCK FOR RAILWAY-CARS.

SPECIFICATION forming part of Letters Patent No. 480,495, dated August 9, 1892.

Application filed December 3, 1891. Serial No. 413,893. (No model.)

*To all whom it may concern:*

Be it known that I, ERNEST D. DORCHESTER, a citizen of the United States, residing at Malden, in the county of Middlesex and State of Massachusetts, have invented new and useful Improvements in Trucks for Railway-Cars, of which the following is a specification.

The object of this invention is to improve the construction of trucks for railway-cars, more especially trucks for electric cars and for street-railways.

The improvements have particular relation to means which affect the traction, whereby with a given exertion of power the propulsion of the car is the better attained and the rounding of level or grade curves the more readily insured and with a lessened destructive effect upon the wheels.

Another aim of the invention is to produce a truck which while efficient for all demands thereon embodies a remarkably light and short truck-frame.

Other advantages derived under the invention will be apparent from the description hereinafter given.

To these ends the invention consists in the construction and combination of parts, all substantially as will hereinafter fully appear, and be set forth in the claims.

In the accompanying drawings, Figure 1 is a plan view, and Fig. 2 is a side elevation, of the improved truck. Fig. 3 is a sectional view in detail taken on line 3 3, Fig. 2; and Fig. 4 is a section taken on line 4 4, Fig. 1.

In the drawings, A represents the outer axle of the truck, and B the inner axle. The car-wheels $a$ $a$, which are upon the axle A, are, as indicated, considerably larger than the wheels $b$ upon the axle B. Each axle has thereon at each end outside of the wheels the journal-boxes $d$ $d$, which may be of any usual or approved construction, and mounted upon the journal-boxes is the truck-frame C, which consists of yoke or saddle beams $f$ $f$ of suitable conformation, arranged longitudinally to extend over and beyond side pairs of the axle-boxes and of transverse beams or girders $g$ $g$. The body bolster-frame, which is included in this truck and indicated at D, consists of a frame having a suitable plan conformation, which may be substantially as in Fig. 1, or it may be rectangular, the same consisting of a surrounding frame $h$ of channel-iron or other material and diagonal truss or brace beams $i$ $i$. In the present truck it will be seen that the body bolster-frame D has its center $j$ (at and upon which the weight of the car-body is directly brought) located directly over the center of the outer axle A, which is supported by the larger wheels $a$ $a$, and it will be further noticed that the said body bolster-frame D is considerably shorter than the truck-frame C, and at its inner end does not extend beyond the vertical plane coincident with the axle B.

F represents the electric motor, which at its outer end is hung at $k$ $k$ upon the forward axle of the truck and at its rear end is supported at $l$ by the axle D through means of intermediate appliances between the motor extension and the said inner axle. The motor may, if desired, be otherwise supported. It will be observed that practically the entire weight of the car-body which the truck supports will be sustained by the axle A and the larger wheel thereon, the inner axle B merely receiving a division of the weight of the motor, which latter weight is distributed between the two axles.

Now it will be seen that in the truck having the wheels of the form and relative arrangement shown and in combination with or embodying the bolster for receiving the support thereon of substantially all of that portion of the weight of the car-body which the truck is designed to sustain directly over the axle A increased traction is had upon the larger wheels, and owing to the decreased diameter of the second pair of wheels said pair may have their tread much nearer the tread of the larger wheels than in trucks as heretofore constructed, and consequent upon this arrangement the truck becomes the more readily interchangeable for use under either open or closed cars, for when the truck is in use under an open car the smaller wheels will be entirely below the running or foot board and the lateral throw of the smaller at the time of rounding curves will not be interfered with by the running-board. The bolster-frame D is spring-supported above the truck-frame proper C, the springs $m$ encircling the pendent rod $n\ n$, which are rigidly fixed to and extend below the bolster-frame. These rods $n\ n$ pass below the under sides of the yokes and are united by the longitudinally-extending brace $o$ in a common manner. In order to relieve any twisting or distorting effects upon the said pendent rods and to increase the rigidity of engagement (so far as lateral movements are concerned) of the bolster-frame with relation to the truck, there is between the said latter parts hub or boss and socket engagements at points directly above the journal-boxes, as indicated at $p$. The device in this position, as particularly shown, consists of a socketed fixture $q$, applied upon the border-frame of the bolster, and the cylindrically-formed part $r$, which is affixed to the truck to upwardly extend and fit in the said socketed part $q$, and all in such a manner that the bolster-frame may have a rising-and-falling movement with the compression and reaction of the springs, but so that there will be no undue lateral movement of the socketed part $q$ with relation to the boss $r$.

The bolster-frame is diagonally trussed or braced by the four ribbed bars or T-irons $i$, which are united at the center and directly over the position of the axle A by being bolted to a common plate or block $s$, which is centrally formed for receiving the swivel connection therewith of the car-body. This block $s$ has the angular extensions $t\ t$, which are recessed, as indicated at $u$, to receive the ribs of the said truss-bars or T-irons. The ends of these bars are riveted to the border-frame $h$ of the bolster and also to the said block $s$, and by their connection at the center of the bolster-frame last described are more effectually prevented from endwise thrusts and lateral or transversal deflection.

Having thus described my invention, what I claim, and desire to secure by Letters Patent, is—

1. In a truck for railway-cars, an axle having a pair of driving-wheels thereon, and a pair of guide-wheels, and a saddle or truck frame supported by said two pairs of wheels, springs supported on the truck-frame near the journals of the driving-wheels only, a body bolster-frame supported entirely by said so-located springs, and the car-body pivotally mounted on the said bolster-frame directly over the axle of said driving-wheels, substantially as and for the purpose set forth.

2. In a truck for railway-cars, an axle having a pair of driving-wheels thereon, and a pair of guide-wheels which are of less diameter than the driving-wheels, and a saddle or truck frame supported by said two pairs of wheels, springs supported on the truck-frame near the journals of the driving-wheels only, a body bolster-frame supported entirely by said so-located springs, and the car-body pivotally mounted on the said bolster-frame directly over the axle of said driving-wheels, substantially as and for the purpose set forth.

3. In a truck for railway-cars, an axle having a pair of driving-wheels thereon, and an axle having a pair of guide-wheels, and a saddle or truck-frame supported by said two pairs of wheels, springs supported on the truck-frame near the journals or the driving-wheels only, a body bolster-frame supported entirely by said so-located springs, the car-body pivotally mounted on the said bolster-frame directly over the axle of said driving-wheels, and a motor having its weight supported by and distributed between said axles and operating to drive the wheels which sustain the weight of the car-body, substantially as and for the purpose set forth.

4. In a truck for railway-cars, the combination, with the lower frame or truck-frame proper and two pairs of supporting-wheels therefor, of a body bolster-frame supported above the truck-frame proper through the medium of springs which rest on the truck-frame closely to and forward and rearward of the journal-bearings of but one of said pairs of wheels, and posts rigidly secured to and pending from the bolster-frame and passing through the supporting-spring and the truck-frame at different points in the length thereof, there being between the bolster and truck-frame proper and directly over the journals boss-and-socket engaging portions, the one of which may play vertically relative to the other, substantially as and for the purpose described.

5. The combination, with the truck-frame proper, of the bolster-frame spring supported thereby, which consists of a border-frame $h$ and intersecting ribbed cross braces or trusses and the central swivel-block having recessed portions with which the ribs of the said braces engage and to and through which portions the inner ends of the said braces are bolted, substantially as described.

ERNEST D. DORCHESTER.

Witnesses:
WM. S. BELLOWS,
J. D. GARFIELD.